United States Patent [19]

Thorn et al.

[11] Patent Number: 4,700,281
[45] Date of Patent: Oct. 13, 1987

[54] DIRECT-CURRENT-ALTERNATING-CURRENT INVERTER COMPRISING A LOAD WHICH GAINS BY FORCING AN OUTPUT VOLTAGE OF THE DIRECT-CURRENT-ALTERNATING-CURRENT INVERTER HAVING A DEFINED WAVE SHAPE AND FREQUENCY

[75] Inventors: Gernot Thorn, Hanau; Friedrich-Werner Thomas, Gelnhausen; Johann Stürmer, Freigericht; Dietrich Dahlinger, Darmstadt; Guido Hubertus, Mainz; Wolfgang Sperzel, Gelnhausen, all of Fed. Rep. of Germany

[73] Assignee: Leybold-Heraeus GmbH, Cologne, Fed. Rep. of Germany

[21] Appl. No.: 795,990

[22] Filed: Nov. 6, 1985

[30] Foreign Application Priority Data

Nov. 9, 1984 [DE] Fed. Rep. of Germany ....... 3441000
Nov. 9, 1984 [DE] Fed. Rep. of Germany ....... 3441001

[51] Int. Cl.$^4$ ............................................. H02M 5/45
[52] U.S. Cl. ............................................. 363/37; 363/58; 363/79; 363/96; 363/136
[58] Field of Search .................... 363/37, 55, 56, 57, 363/58, 79, 96, 136

[56] References Cited

U.S. PATENT DOCUMENTS

4,231,083 10/1980 Matsuda et al. ..................... 363/57
4,280,038 7/1981 Havas et al. ........................ 363/37
4,549,256 10/1985 Matthes et al. ..................... 363/37

Primary Examiner—Patrick R. Salce
Assistant Examiner—Anita M. Ault
Attorney, Agent, or Firm—Koda and Androlia

[57] ABSTRACT

The invention concerns a converter (2) provided with GTO thyristors the frequency and characteristic shape of its output voltage ($U_A$) being constrained by a load (3). The frequency of the converter (2) is matched to the constrained output voltage ($U_A$) with the aid of a regulating circuit (4). Non-simultaneously switched GTO thyristors are switched on and off in a predetermined timed relation to each other (FIG. 3).

30 Claims, 13 Drawing Figures

DIRECT-CURRENT-ALTERNATING-CURRENT INVERTER COMPRISING A LOAD WHICH GAINS BY FORCING AN OUTPUT VOLTAGE OF THE DIRECT-CURRENT-ALTERNATING-CURRENT INVERTER HAVING A DEFINED WAVE SHAPE AND FREQUENCY

The invention concerns a power converter with a load which produces a converter output signal of predetermined shape of curvature and frequency.

Converters convert direct current into alternating current in the course of which energy flows from the direct current system into the alternating current system. A general distinction is made between self-commutating and externally commutated (command input controlled) converters. For externally commutated converters an external source of alternating voltage not belonging to the converter is required which is available for the commutating voltage during commutation. Self-commutating converters do not require an external alternating voltage source for commutation. Rather, the commutation voltage is made available from a power source belonging to the converter.

Since the alternating voltage produced by self-commutating converters does not depend from an external alternating voltage, its frequency may be changed within wide limits.

In addition to the self-commutating and the externally commutated converters, load-commutated converters may also be distinguished which to a certain extent take up an intermediate position and may be regarded on the one hand more like externally commutated converters and from another point of view more like self-commutating converters. With load-commutated converters the load makes the commutation voltage available. Since a converter requires an inductive reactive output, the load current must have a capacitive component. This condition may be fulfilled by parallel-resonant and series-resonant circuits or by an over-excited synchronous machine.

Single-phase or multi-phase series-compensated and parallel-compensated converters are already multifariously known (K. Heumann: Fundamentals of Power Electronics, Teubner-Verlag Stuttgart, 1975, pages 110–113; German accepted Patent Application No. 1,615,126; German accepted Patent Application No. 1,563,132 German published Application No. 2,421,193; German published Application No. 3,237,716; British Patent Specification No. 1,494,338). In all these converters such switching means are used—preferably symmetrically turning off thyristors, so-called SCR-thyristors—which require commutation means and in which the series-resonant or parallel resonant circuits serve as the commutation means.

This type of commutating means, which are also required not only for SCR (silicon controlled rectifier) thyristors but also for ASCR (asymmetrically blocking silicon controlled rectifier) thyristors and RLT thyristors, cause electromagnetic noise. GTO (=Gate Turn Off) thyristors do not have this advantage because they do not require any commutation means at all. Hence converters made up of GTO thyristors are quieter and mostly also smaller than comparable converters constructed from other types of thyristor. Certainly conventional GTO circuits frequently involve an additional expense in control circuitry and in protective wiring.

The main advantage of the GTO thyristor lies in that it can only be switched off by a reverse control current. But this is somewhat at the expense of other characteristics, such as for instance the turn-on time, forward (on-state) power loss, overload resistance and switching power loss. This switching power loss increases directly proportionately with the repetition frequency. Hence in general a GTO thyristor does not attain the upper repetition frequency of ASCR thyristors and RLT thyristors. As a rule the turn-off power loss is greater than the turn-on power loss. Since turn-off power loss occurs in every switching process, its share of the total power loss becomes more appreciable with increasing repetition frequency and must be taken into account for each application of GTOs (Journal 'etz', Volume 104, 1983, No. 24, pp. 1246–1251: ASCR, RLT (Ruckwarts Leitender Thyristor) and GTO Thyristor Types, Techniques and Limitations of their Use; Journal 'etz', Volume 104, No. 24, pp. 1252–1255: Between Transistor and Thyristor—the GTO Thyristor).

It is nevertheless already known to limit the rate of off-state voltage on switching off by means of suitable connection measures, for instance by means of a so-called RCD (resistance, capacitance and diode) connection. In such a case each turn-off thyristor is provided with its own RCD circuit (see Bösterling, Ludwig, Schimmer and Tscharn: 'GTO Practice, Turn-Off Thyristors for Self-Commutating Converters', special publication of the AEG-Telefunken Company, 1983; Berg, Bösterling and Luse: Turn-Off Thyristors (GTO) for new inverter concepts, Company Publication of AEG-Telefunken, 1984). Despite these known measures the frequency range for which the known turn-off thyristors may be applied is limited to a relatively narrow range and in particular by extensive utilisation of the highest permissible forward current, frequencies between about 3 and 5 kHz must be seen as maximum frequencies. Attempts to increase this frequency have hitherto always had the consequence of a corresponding lowering of the highest permissible forward current, because otherwise the thermal loading of the thyristors could no longer be controlled.

Nevertheless, nowadays there exists a whole series of consumers requiring higher frequencies of up to 20 or 30 kHz. A very wide possibility of application consists in static conversion apparatus for inductive heating plants, particularly for inductive melting plants. A further field of application concerns compact current supplies with correspondingly small magnetic components, such as for instance transformers.

For high outputs practically exclusively converters with so-called frequency-thyristors are used nowadays for the above-described purposes which require costly commutation-aids as well as circuit engineering measures in order to assure the required protection time $t_s$. A limitation of the switching frequency to a few kilohertz is necessary also for this type of converters, frequently the measure being accompanied by a reduction in the utilisation of the component, i.e. reduction in the switching currents, in order not to exceed the permitted power losses for the component.

Accordingly, the underlying task of the invention is to provide a converter with GTO thyristors in which the switch-off power loss of the GTO thyristors is drastically reduced.

This task is achieved in that turn-off thyristors are used with a converter with a load constraining a converter output voltage of predetermined characteristic curve and frequency, and that a circuit arrangement is provided which prevents a phase displacement between the output current and the output voltage.

In an advantageous further development of the invention a circuit arrangement is used by means of which the time between the turn-off pulse of the leading branch and the turn-on pulse of the other branch can be set in a defined way.

The advantage achieved by the invention consists in particular in that the converter may be operated with a significantly higher frequency with full loading capacity of the turn-off thyristors. The increase in frequency amounts to a multiple in comparison with conventional GTO converters.

By means of the circuit arrangement according to the invention, which may be supplemented by the known RCD circuit, the rising slope of the voltage is greatly reduced after switching off the current in such a manner that the turn-off power loss or dissipation is reduced to a fraction of the original value. Consequently, for the same thermal load on the component the frequency may be significantly raised, for instance to values considerably above 10 kHz without the heat removal from the turn-off thyristors becoming problematic. Consequently, the limiting values valid for the turn-off thyristor may simultaneously be exploited with the technologically usual safety clearances.

The invention is particularly advantageously suited to heating or melting of materials forming a part of the load, particularly a parallel resonant circuit. When ferromagnetic materials are used for which the magnetic resistance alters significantly on exceeding the Curie temperature; the resonant circuit is detuned by is then compensated by readjustment according to the invention.

Preferred embodiments of the invention are illustrated in the drawings and will be described in detail in what follows. In the drawings.

Figure 1:
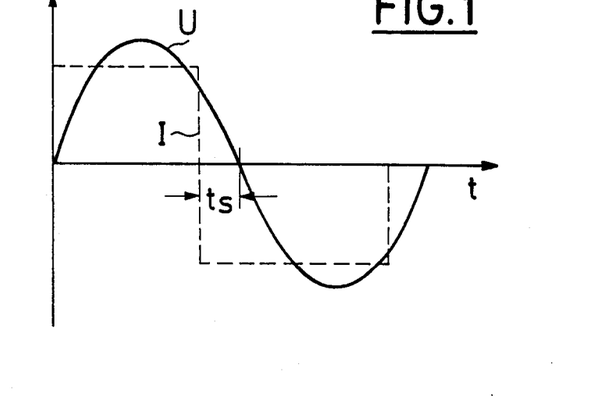
FIG. 1 is a diagram of the behaviour curve with time of current and voltage in a conventional load-commutated thyristor converter.

FIG. 1 shows the behaviour curve against time (abscissa) of the current I and voltage U in a load-commutated thyristor inverter. In the interests of a faultless commutation and collapse of the charge carrier within the so-called circuit-commutated recovery time a phase shift $t_s$ between current and voltage is necessary. This phase shift is necessarily accompanied by an increase in switching losses and a restriction of the frequency; herein $t_s$ is the so-called 'protection time'.

Figure 2:
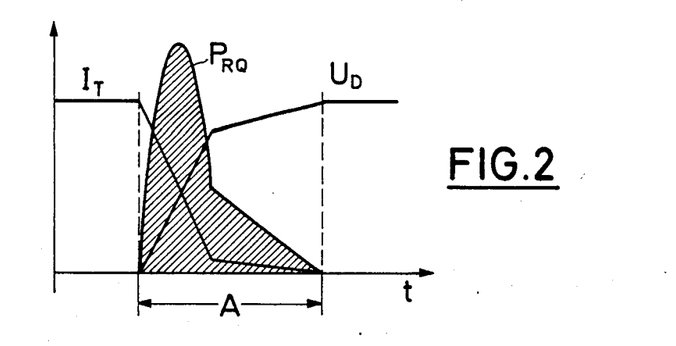
FIG. 2 is a diagram of the behaviour curve of current and voltage in a classical arrangement with turn-off thyristors and inductive load.

FIG. 2 largely corresponds with diagram 6 in the above-mentioned special publication 'Practice with GTO Turn-Off Thyristors for Self-Commutated Converters'. During the turn-off time A the current $I_T$ falls according to the illustrated curve, and within the same time the voltage $U_D$ rises, also according to the illustrated voltage curve. The product of current and voltage leads to the behaviour curve surrounding the shaded area. This in turn is a measure of the turn-off power loss $P_{QR}$ which is high because of the steep rise in voltage. From this it may be seen that the power loss increases with increasing frequency so that the operational temperatures of the turn-off thyristors may no longer be controlled.

Because of this fact the use of turn-off thyristors (GTO) is similarly restricted because of the described characteristics in regard to the switching frequency and its application displays no significant advantages over known inverter circuits with frequency thyristors and phase displacement according to FIG. 1.

Figure 3:
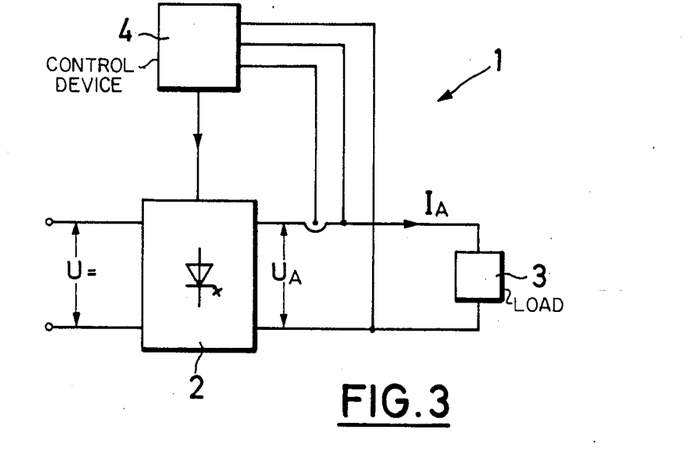
FIG. 3 is a schematic connection diagram of the converter according to the invention.

FIG. 3 illustrates the circuitry of the invention in principle. $U_=$ designates a direct voltage which is converted to an alternating voltage $U_A$ by means of the circuit arrangement 1 according to the invention. The circuit arrangement 1 has a GTO thyristor 2 to which the direct voltage $U_=$ is fed. A load determining the frequency and curvature of the output voltage $U_A$ of the thyristor converter 2 is at the output of GTO thyristor inverter 2. The output voltage $U_A$ of the inverter 2 as well as the associated output current $I_A$ are captured and evaluated by a device 4. This device 4 controls the GTO thyristors of the converter 2 in such a manner that a possible phase shift between $U_A$ and $I_A$ is obviated.

In contrast to conventional thyristor converters according to FIG. 1, no turn-off or extinction angle is permitted.

Figure 4:
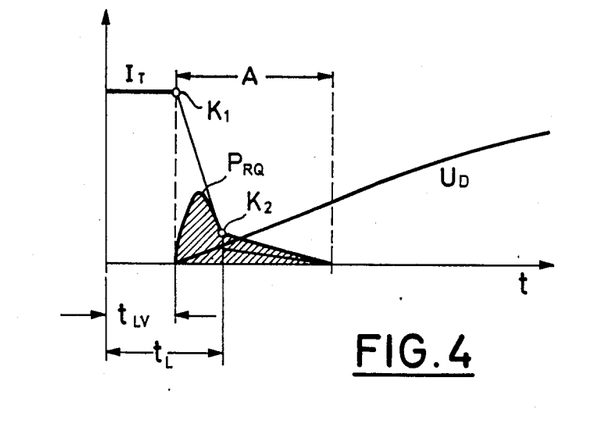
FIG. 4 is a diagram of the behaviour curve of the current and voltage in a turn-off thyristor connected according to the invention.

FIG. 4 illustrates how the current and voltage behave at the thyristor when the circuit arrangement according to the invention is utilised. It is here assumed that the load 3 is represented by a parallel resonant circuit which causes a voltage $U_D$. It may be seen clearly that within the turn-off time A the voltage $U_D$ has a significantly lesser rising slope than in the case according to FIG. 2. The turn-off current $I_T$ has essentially the same behaviour as in FIG. 2. However, the result is that the product of I and U leads to a much flatter curve—compare the contour line of the shaded area—than is the case in FIG. 2. Consequently the power loss is also very much lower and the circuit arrangement according to FIG. 3 may consequently be operated, with full rate of utilisation of the turn-off thyristors, at signifcantly higher frequencies. The voltage curve $U_D$ according to FIG. 4 corresponds to a sinusoidal line, compelled by the existence of a resonant circuit.

Figure 5:
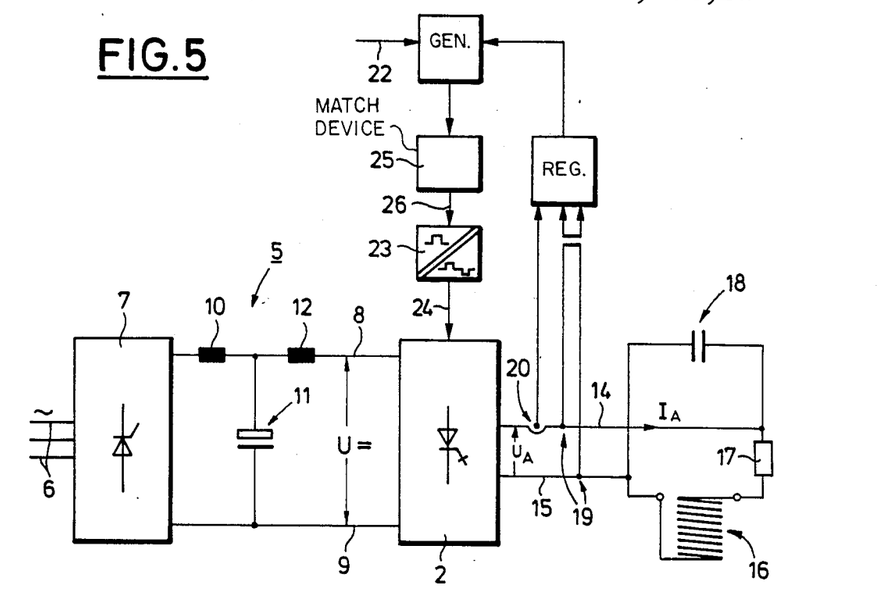
FIG. 5 is a circuit arrangement according to the invention in which a parallel resonant circuit is provided as load for the converter.

In FIG. 5 the circuit arrangement according to FIG. 3 is shown again more precisely. One may recognize here a current supply source 5 formed as an inverter and supplied with three-phase current via a three-core cable 6. Direct current produced by means of a thyristor rectifier 7 is made available at the conductors 8 and 9. The thus formed DC circuit has a smoothing choke 10, a smoothing capacitor 11 and an intermediate choke 12.

The conductors 8 and 9 lead to a converter 2 fitted with turn-off transistors (GTOs). This converter is controlled by a pulse generator 13. Controlling converters according to frequency are in themselves already known (British Patent Specification Nos. 1,368,216 and 1,494,338, German Published Application No. 32 37 716, German Journal: Siemens Brochure, 'Thyristor-controlled Resonant Circuit converter for Inductive Heating Plants', Order No. E 238/1951; East German Magazine 'Elektrie' Volume 35, 1981, pages 651–655). In these control arrangements no GTO thyristors are used and in addition no exact phase equality between current and voltage is sought, but rather always a phase shift is knowingly produced.

The output of the converter 2 leads via conductors 14 and 15 to an inductor 16 which in the present case is constructed as a cylindrical induction coil. The material to be treated and/or to be melted may be accommodated in this coil 16, whereby the total load contains an additional ohmic component which is represented here by an equivalent resistor 17 connected in series. A capacitor 18 is arranged in parallel to the inductor 16, relative to the converter 2, to complement the inductor 16 to a resonant circuit which is arranged for instance for a frequency of 20 kHz. When the induction coil 16 receives a corresponding frequency the material disposed in the coil may be melted or only heated, for instance to finish the surface in the presence of a reaction gas. For this purpose the inductor 16 may be accommodated in a non-illustrated chamber in which the required atmosphere is maintained and which may for example consist of a vacuum and/or an inert gas.

Taps 19 and 20 for the voltage $U_A$ and current $I_A$ are fitted to the conductors 14 and 15. By means of these taps 19 and 20, e.g. the phase relation between $U_A$ and $I_A$ may be monitored by means of a measuring and indicating device. The taps 19 and 20 form part of a regulating arrangement 21 the output of which is again coupled to generator 13. In the regulating arrangement 21 the sign and magnitude of the phase shift between $U_A$ and $I_A$ are detected and converted by means of an integrating member into an output signal of the correct sign proportional to the phase shift. This latter serves as an input signal for the generator 13 which is formed as a voltage-frequency converter. In other words, the output frequency of the generator 13 is proportional to the input voltage. The generator 13 is provided with a further input 22 by means of which, for instance, a manual setting of the output frequency of the generator is made possible. Thus if, for instance, the output voltage of the regulating arrangement 21 rises due to advancing current, then the output frequency of the converter is regulated to be high and the thyristors fire earlier. This leads to the phase shift being controlled to the lowest possible value determined by the control error. In contrast, should the output voltage of the regulating arrangement 21 drop through a lagging current, the output frequency of the converter is regulated to a low value and the thyristors will fire later. In this way the phase shifts and the reactive power are regulated to the lowest possible values. A matching device 25 is disposed between the generator 13 and the converter 2 for displacing the switch-on pulse relative to the switch-off pulses of the turn-off thyristors. This displacement or shift will be described in greater detail below in connection with the following Figures.

Figure 6:
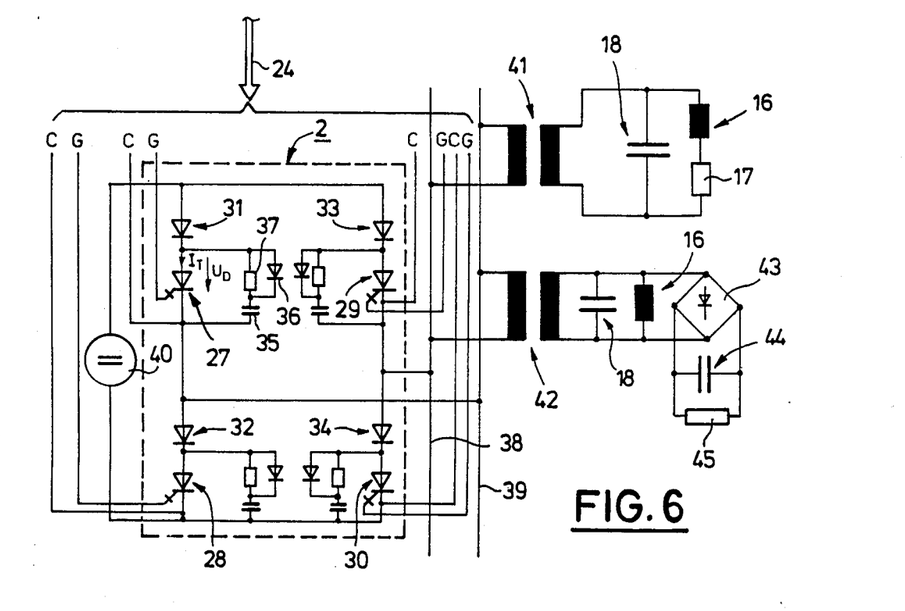
FIG. 6 shows details of the converter with various inductors and consumers, in which the GTO thyristors of the converter form a bridge circuit.

In FIG. 6 the details of the converter 2 are shown. This has in all four turn-off thyristors 27, 28, 29, 30 arranged in a bridge circuit. Since in the present case these turn-off thyristors 27–30 are not reversely blocking, rapidly blocking diodes 31, 32, 33, 34 are connected to them in series. Further, to protect the turn-off thyristors against impermissible dynamic loading, they are associated with simple resistor-capacitor networks, so-called RCD members 35, 36, 37 of which, however, only one is provided with reference numbers. These RCD members 35, 36, and 37 are not absolutely necessary but nevertheless together with the arrangement according to FIGS. 3 and 5 provide surprising effects.

The converter 2 is provided with two bus lines 38, 39 to which different resonant circuits containing the inductor 16 and capacitor 18, or electrical machines may be selectably connected. Thus, for instance, the resonant circuit shown at the right part of FIG. 5 may be connected directly to the buses 38 and 39. However, in FIG. 6 two additional alternative possibilities are shown for connecting the resonant circuits via transformers 41 and 42. In the case of the upper resonant circuit connected via the transformer 41, the inductor or coil 16 itself represents the load, i.e. in analogy with the arrangement of FIG. 5 it forms an induction coil in which the material to be heated is accommodated. The ohmic resistance resulting therefrom is shown as an equivalent resistor 17.

In the case of the resonant circuit connected via the transformer 42, a rectifier bridge 43 is connected parallel to it and leads to a load 45 in the form of an ohmic resistance. The inductor 16 which is present here also need not, however, be the actual load or consumer. For instance, the ohmic load 45 may represent the heating resistance of a resistance furnace. A smoothing capacitor 44 provides for extensive smoothing of the output voltage of the rectifier bridge 43.

The converter 2 is controlled via a four-core control cable 24 in such a manner that the the turn-off thyristors 27, 30 and the turn-off thyristors 28, 29 are switched alternatingly to conduction. Especially for still higher frequencies it is here expedient so to arrange the switch-on pulse of the turn-off thyristors 27, 30 that they have a time interval between the preceding turn-off pulses of the other turn-off thyristors 28, 29 and vice versa. Here the time interval must correspond at least to the turn-off delay time and at most to the turn-off time. This will be explained in detail below. On the one hand, the rising voltage after turn-off of one group of turn-off thyristors should not take place too early, which would lead to higher losses, while on the other hand there must not be a 'gap' between the alternatingly switching groups of the turn-off thyristors, which would also lead to an undesired loading of the turn-off thyristors. The matching device 25 is provided more accurately to set the time relations between the switch-on pulses on the one hand and the switch-off pulses on the other hand, and is connected by a four-core control cable 26 with a device 23 for potential division and pulse shaping.

Figure 7:
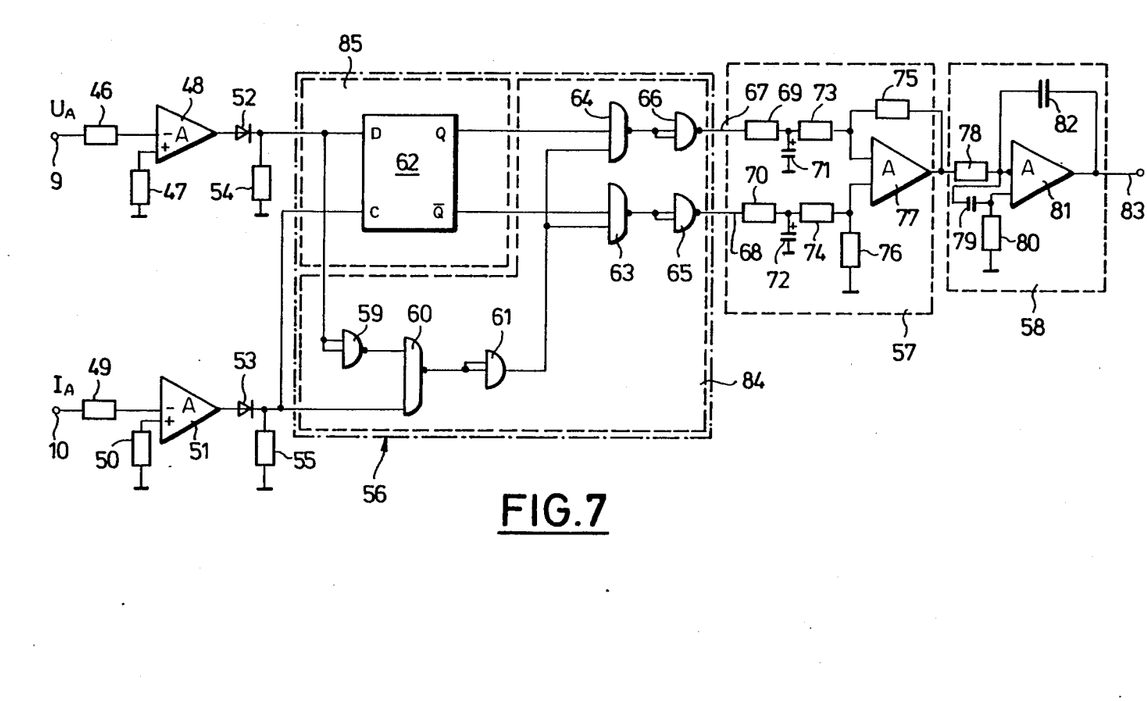
FIG. 7 shows a phase detection circuit which detects a phase shift between the output voltage and the output current of the converter and gives a signal which indicates the magnitude and sign of the phase shift.

In FIG. 7 a circuit arrangement is shown which in essence represents a concretisation of the regulating arrangement 21 according to FIG. 5. The output voltage $U_A$ and the output current $I_A$ are passed via resistors 46 and 49 to comparators 48 and 51 the respective second inputs of which are grounded via a resistor 47, 50 respectively. The comparators 48, 51 are connected via a recognition circuit 56 to a differential amplifier 57 and a phase regulator 58. The ouput signal of the phase regulator 58 passes via conductor 83 to an already mentioned generator 13 which is formed as a voltage-frequency converter.

Diodes 52, 53 are connected after the comparators 48, 51 so that in each case only positive signals can be passed to the recognition circuit 56. The cathode of the diode 53 is grounded via a resistor 55 and is in addition connected with one input of a NAND member 60 and with one input of a store, a flip-flop 62. This input of the flip-flop 62 is designated C.

The cathode of the diode 52 is grounded via a resistor 54 and at the same time is connected with another input D of the flip-flop 62 as well as with another input of the NAND member 60 via an inverting member 59. The flip-flop has a storage function herein and is therefore surrounded by broken lines and designated by 85. Another component could also serve as the store 85. The output of the NAND member 60 is led to an inverting member 61 the output of which in turn leads to further NAND members 63 and 64. The second input of the NAND member 63 is connected with the output $\overline{Q}$ of the flip-flop 62 while the second input of the NAND member 64 is connected with the output Q of the flip-flop 62. The output of the NAND member 64 is passed to the input of an inverting member 66 which is connected with one input of a differential amplifier 77 via series-connected resistors 69,73. Analogously, the output of the NAND member 63 is connected via an inverting member 65 and the series-connected resistors 70, 74 with another input of the differential amplifier 81. A respective grounded capacitor 71, 72 is connected to the connection between the resistors 69, 73 and 70, 74 respectively. Similarly, the connection between the resistor 74 and the amplifier 77 is grounded by a resistor 76.

The output of the differential amplifier 77 which is fed via a resistor 75 is connected with an integrating member 58, and more particularly via a resistor 78. This integrating member contains an operational amplifier 81 with a feed-back capacitor 82, one of the inputs of the operational amplifier 81 being connected with a resistor 80 which is grounded. The other input of the operational amplifier 81 to which the feedback capacitor 82 and the resistor 78 are also connected, is coupled via a capacitor 79 with said one input.

With the aid of the recognition circuit it is possible to ascertain an advance in current or voltage with the correct sign and to determine the amount of this advance. Since the components of the recognition circuit 56 are in themselves known digital components of known mode of operation, a more detailed description of the signal processing is unnecessary. However, it is to be remembered that the outputs 67, 68 of the recognition circuit 56 feed such signals to the amplifier 77 that a positive or negative voltage with an amplitude proportional to the phase displacement arises at the amplifier output.

Because of the capacitor 82 in the feedback coupling the phase regulator 58 has an I behaviour. The circuits 56 and 57 measure the actual value of the phase displacement. Since the desired value is zero it is unnecessary for it to be prescribed. It is here significant that the whole arrangement operates with the actual frequency of the converter 2.

Figure 8:
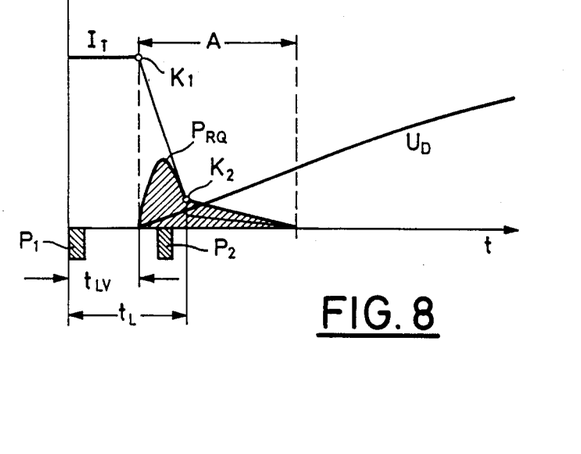
FIG. 8 is a diagram of the behaviour curves of the current and voltage for a GTO thyristor connected in accordance with the invention, in which the turn-on and turn-off pulses are represented.

FIG. 8 illustrates how the ratio of the switch-on and switch-off pulses is chosen. Here FIG. 8 essentially corresponds to FIG. 4; only the pulses $P_1$ and $P_2$ are added. Starting from the swtich-off pulse $P_1$ a gate-controlled delay time $t_{LV}$ *extends approximately to the instant where the current* $I_T$ *falls steeply (position* $K_1$). This gate controlled delay time typically amounts to about 4 microseconds for common turn-off transistors. Starting from the switch-off pulse $P_1$ the so-called gate controlled turn-off time $t_L$ extends to the point $K_2$ where the curve for the current $I_T$ has a further significant kink. The current still present behind this kink position is designated as 'trailing current'. Correspondingly, the time in which this current becomes zero is designated the 'trailing time'. The gate controlled turn-off time is therefore calculated from the time of the switch-off pulse $P_1$ to the time when the transient current $I_T$ minus the so-called trailing time becomes zero. This turn-off time is approximately 7 microseconds for commercially common turn-off thyristors. To achieve optimal conditions, the switch-on pulse $P_2$ of the respective other group is set in a time range which lies between the gate controlled delay time $t_{LV}$ *and the turn-off time* $t_L$, as shown in FIG. 8. Such a measure considerably increases in significance with increasing commutation frequency because with increasing frequency also the rising turn-off losses are reduced. The time interval between pulse $P_1$ and $P_2$ may be altered within predetermined limits by the mentioned matching device 25.

Figure 9A:
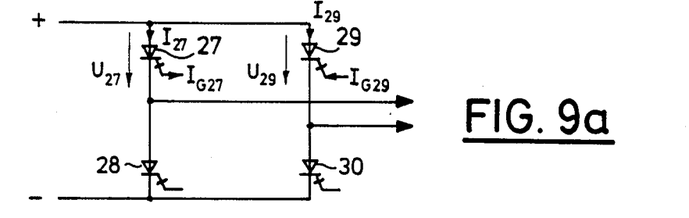
FIG. 9a shows a GTO thyristor bridge circuit.
Figure 9B:
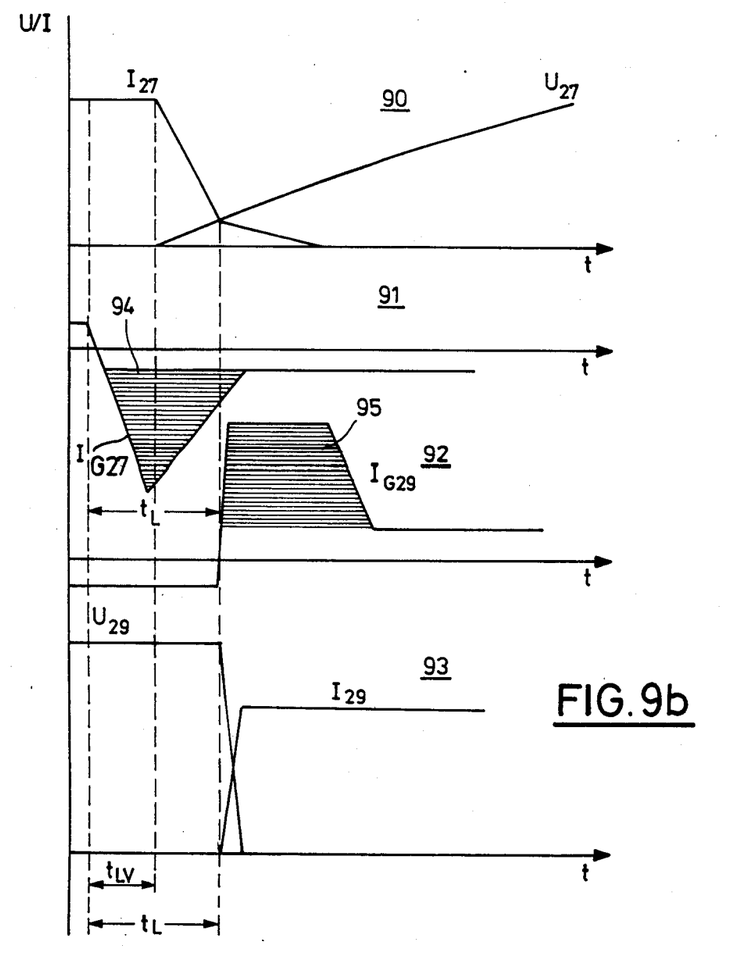
FIG. 9b is a diagram of the behaviour curve against time of current and voltage for two oppositely lying thyristors of a GTO thyristor bridge circuit.

In FIG. 9a the turn-off thyristors according to FIG. 6 are shown again in simplified representation in order to make the switch-on and switch-off processes clearer with the aid of FIG. 9b. In the upper part 90 of FIG. 9b the turn-off process at thyristor 27 is shown. This process follows already from FIGS. 4 and 8. The portion 91 of FIG. 9b shows additionally also the course of the schematically illustrated turn-off pulse formed by current $I_{G27}$ at the control grid of the thyristor 27. The shaded area 94 enclosed by the current $I_{G27}$ may be designated as the 'turn-off pulse'.

The length of the pulse depends on the way it is produced. As may be seen from portion 92 of FIG. 9b, the switch-on pulses is circumscribed by the current at the control grid of thyristor 29.

The voltage $U_{29}$ and current $I_{29}$ are shown in the portion 93 of FIG. 9b and more particularly with regard to their course during the switch-on process of thyristor 29. It may be seen here that $U_{29}$ begins to decrease at time $t_{LV}$, while $I_{29}$ begins to increase at time $t_L$ only. For optimizing the invention the relative positions of the turn-off pulse 94 and the switch-on pulse 95 illustrated in the portions 91 and 92 of FIG. 9b are of great significance. Should for instance the pulse 94 approach the pulse 95, the turn-off of thyristor 27 would take place later. The thyristor 27 would then still be turned on while the thyristors 28 and 29 would already be turned on. Hence a transverse or lateral short circuit would result over the section of thyristors 27 and 28. If, on the other hand, the interval between pulses 94 and 95 becomes greater, then the thyristor 27 is already turned off while the thyristor 29 is still turned off. By means of an intermediate choke 12 which produces a current, the current would be passed on and an overvoltage would arise at all thyristors. An important part of the invention is therefore a possibility for slight trimming in such a manner that the time interval between the extinction or turn-off pulse and firing pulse is always at most equal to the gate controlled turn-off time $t_L$ and at least equal to the gate controlled delay time $t_{LV}$.

Figure 10:
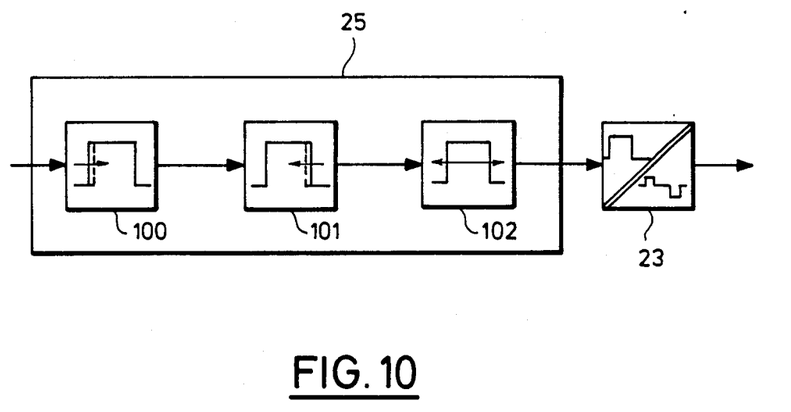
FIG. 10 shows a pulse-shaping and pulse displacement circuit arrangement.
Figure 11:
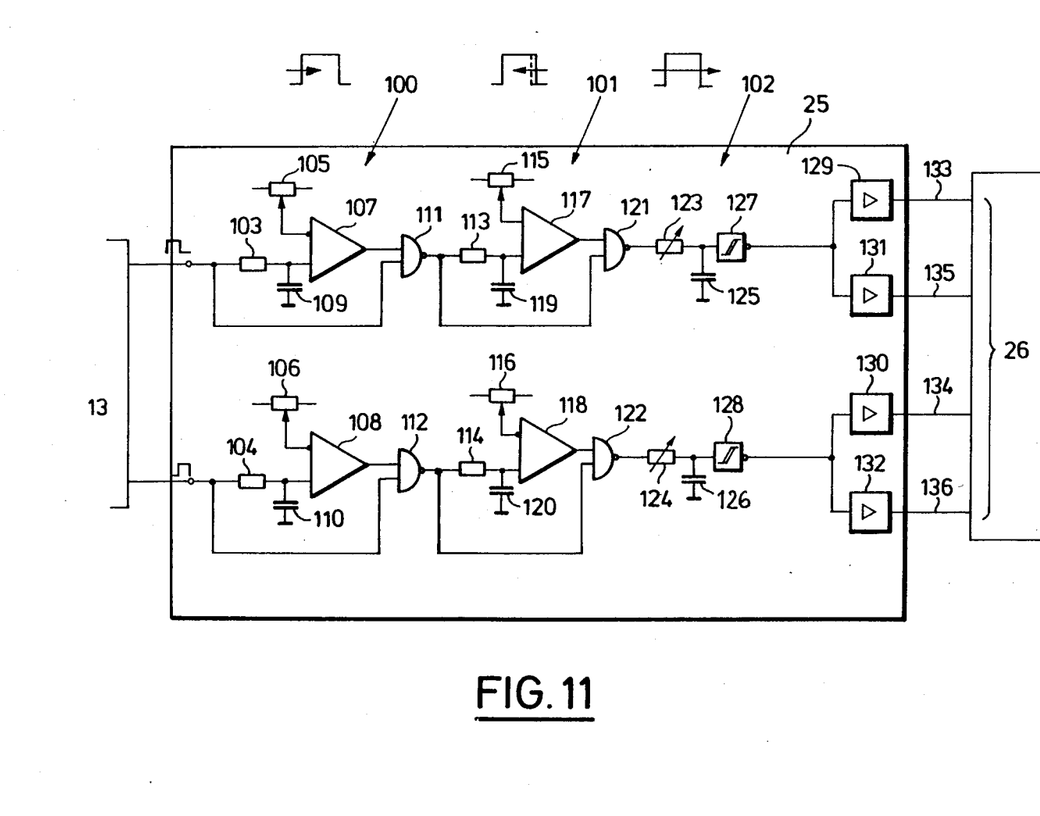
FIG. 11 is a detailed view of the circuit arrangement according to FIG. 10.

In FIG. 10 the circuit 25 according to FIG. 5 is shown again in greater detail. It may be seen here that the circuit 25 has a device 100 for trimming the rising flank of a pulse as well as a device 101 for trimming the trailing edge of a pulse and a device 102 for completely displacing the trimmed pulse in time. In FIG. 11 details of the arrangement shown in FIG. 10 are illustrated. From pulse generator 13 pulses are passed to an upper and lower branch line, where both branches are constructed similarly so that only the construction and mode of operation of one branch requires to be described.

A pulse coming from pulse generator 13 is passed via a resistor 103 to a comparator 107 and directly to a NAND gate 111. From the input of the comparator 107, at which a resistor 103 is disposed, a capacitor 109 is connected to ground. Over this capacitor 109 an exponentially rising voltage is formed when a pulse comes from the pulse generator 13. Via a tap of a resistor 105 a reference voltage is fed to the other input of the comparator by means of which the switching threshold of the comparator may be adjusted. The output of the comparator 107 is connected with a second input of the already mentioned NAND gate 111. At the output of the NAND gate 111 a pulse is produced the rising or leading edge of which may be displaced by means of the resistor 105. The pulse, the steep edge of which is adjustable, appears inverted at the resistor 113 which is directly connected with the output of the NAND gate 111. A comparator 117 constructed in the same manner as the comparator 107 processes this pulse again in the above-described way and passes it to one input of a NAND gate 121. The other input of the NAND gate 121 is directly connected with the output of the NAND gate 111. A pulse arises at the output of the NAND gate the trailing edge of which pulse can be displaced by the resistor 115. The output of the NAND gate 121 is connected via an adjustable resistor, by means of which the whole pulse can be displaced, to a grounded capacitor 125 and to an inverter with a Schmitt-trigger input 127 which in turn leads to two amplifiers 129 and 131. Conductors 133, 135 lead from these amplifiers 129, 131 to the device 23.

Figure 12:
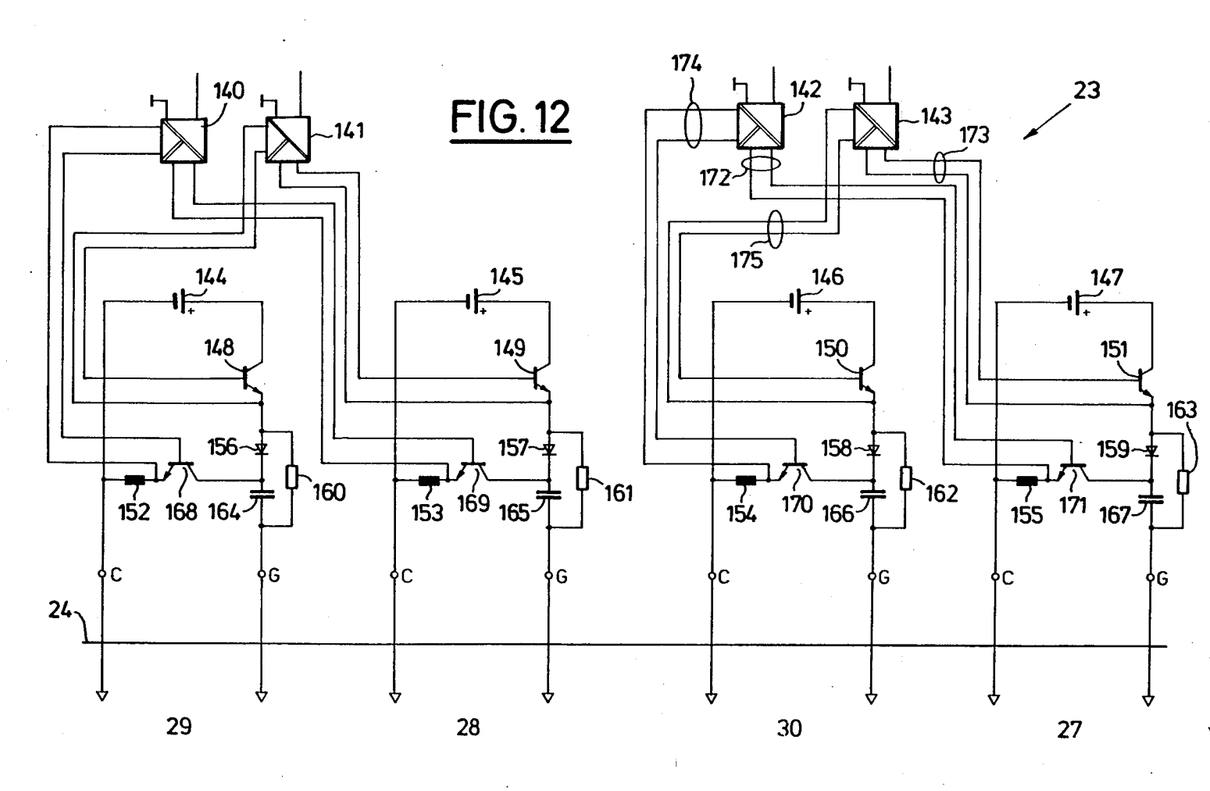
FIG. 12 is a control circuit for a GTO bridge circuit.

In FIG. 12 the apparatus 23 is shown again in greater detail. This device 23 has identical circuit arrangements for controlling the thyristors 28, 29 and 27, 30 and hence only one will be described. Potential dividers 142, 143 with respectively two inputs and twice two outputs are provided here. The outputs 173 of the potential divider 143 are connected with the base and emitter of a transistor 151 while the corresponding outputs 172 of the potential divider 142 are connected with the base and emitter of a further transistor 171. Similarly the outputs of the potential divider 143, 142 are connected with the transistors 150 and 170. The transistor 151 is at one pole of a source of direct voltage the other pole of which is connected via an inductor 155 to the emitter of a transistor 171. Correspondingly, the collector of the transistor 150 is connected with a further source of direct voltage 146 the negative pole of which is connected via an inductor 154 to the emitter of the transistor 170. A diode 159 is disposed in the forward direction between the emitter of transistor 151 and the collector of transistor 171. In a corresponding manner a diode 158 is connected between the transistors 150 and 170. A capacitor 167 connected with a cathode of the diode 159 leads to a connection of thyristor 27. Correspondingly a capacitor 166 connected to the cathode of diode 158 leads to a terminal of thyristor 30. The anode of diode 159 and the output side terminal of capacitor 167 are interconnected via a resistor 131. Correspondingly a resistor 162 connects the diode 158 with the capacitor 166.

The transistor 151 is turned on by a pulse from the circuit arrangement 143 whereby the capacitor 167 is charged up via the diode 159 and the cathode portion of the thyristor 27. When the capacitor 167 is fully charged the current may flow on via resistor 163 until the transistor 151 is blocked. The thyristor 27 is thereby switched on. Alternatingly with the pulse at transistor 151 the transistor 171 receives a pulse from the circuit arrangement 142. The transistor 171 is then switched to conduction and the capacitor 167 discharges via the transistor 171, the inductor and the gate-cathode junction of the thyristor 27. The GTO thyristor 27 is turned off. The inductor services to limit the di/dt of the turn-off gate current.

In a manner corresponding to that of thyristor 27 the thyristors 30 or 28 and 29 are also turned on. The control lines leading to the cathodes are here designed with C while the conductors leading to the control gates are designated with G.

We claim:

1. Converter with a load which constrains converter output voltage of predetermined curvature and frequency, characterized in that the converter (2) contains gate turn-off thyristors (27–30), that a circuit arrangement (4) is provided which prevents a phase displacement between the output current ($I_A$) and the output voltage ($U_A$), and that the output current ($I_A$) is switched when the output voltage ($U_A$) crosses zero.

2. Converter according to claim 1, characterised in that the load is a resonant circuit the resonant frequency of which determines the frequency of the converter (2).

3. Converter according to claim 2, characterised in that the resonant circuit is a parallel resonant circuit (16, 15 17, 18).

4. Converter according to claim 3, characterised in that the parallel resonant circuit contains an inductor (16) and a capacitor (18), the inductor (16) or the capacitor (18) forming part of a consumer or load.

5. Converter according to claim 1, characterised in that the load is an electric machine.

6. Converter according to claim 1, characterised in that a device (21, 13, 25, 23) is provided which tunes the frequency with which the gate turn-off transistors (27–30) are switched to the frequency determined by the load.

7. Converter according to claim 6, characterised in that the device (21, 13, 25, 23) compares the phases of the output current ($I_A$) and the output voltage ($U_A$) and on occurrence of a phase displacement tunes the frequency with which the gate turn-off thyristors (27–30) are switched to the frequency which is determined by the load.

8. Converter according to claim 1, characterised in that a circuit arrangement is provided which passes the turn-off pulse ($P_1$) for a gate turn-off thyristor (27–30) earlier than the zero crossing of the alternating voltage output ($U_A$) by an amount of time corresponding to the gate controlled delay time ($t_{LV}$) to the respective control gate of a turn-off thyristor (27–30).

9. Converter according to claim 1, characterised in that for alternatingly switched gate turn-off thyristors (27, 30 and 29, 28) the switch-on pulses ($P_2$) of one pair are separated by a time interval from the switch-off pules ($P_1$) of the other pair of turn-off thyristors (27 to 29 and 28 to 30), respectively, this time interval being greater than or equal to the gate-controlled delay time ($t_{LV}$) and is smaller than or equal to the gate-controlled turn-off time ($t_L$).

10. Converter according to claim 1, characterised in that a resistance capacitance and diode circuit (35, 36, 37) is provided parallel to the anode-cathode section of one gate turn-off thyristor (e.g. 27).

11. Converter according to claim 1, characterised in that the rise of the voltage ($U_D$, $U_{37}$) caused by the load runs very flat at least from the zero crossing to the turn-off time ($t_L$).

12. Converter with a load which constrains a converter output voltage of predetermined curvature and frequency, characterized in that the converter (2) contains gate turn-off thyristors (27–30), that a circuit arrangement (4) is provided which prevents a phase displacement between the output current ($I_A$) and the output voltage ($U_A$), that a device (21, 13, 25, 23) is provided which tunes the frequency with which the gate turn-off thyristors (27–30) are switched to the frequency determined by the load, that the device (21, 13, 25, 23) compares the phases of the output current ($I_A$) and the output voltage ($U_A$) and on the occurrence of a phase displacement tunes the frequency with which the gate turn-off thyristors (27–30) are switched to the frequency which is determined by the load, that taps (20) for the output current ($I_A$) and taps (14, 19) for the output voltage ($U_A$) are connected via associated comparators (48, 51) of a recognition circuit (56) for detecting the sign and magnitude of the phase displacement, and that the output of the recognition circuit (56) is connected to an integration member (58) for producing an output signal which is of the correct sign and which is proportional to the phase displacement, this output signal serving as an input signal for a pulse generator (13) constructed as a voltage-frequency converter in such a manner that by means of the output frequency of the pulse generator (13) the frequency of the converter (2) is controlled so that the phase displacement can be fed back to the smallest possible value.

13. Converter according to claim 12, characterised in that a phase detection circuit (84) is provided which has a flip-flop (62) to respectively separate inputs of which the actual voltage and actual current at the output of the converter (2) are fed, and which further has a NAND gate (60) to which the actual current at the output of the converter (2) is fed directly and the actual voltage at the output of the converter (2) is fed via an inverting member (59), the two outputs of the flip-flop (62) being passed to respective first inputs of two NAND gates (63, 64) the respective second inputs of which are connected with the output of the mentioned NAND gates (60, 61).

14. Converter with a load which constrains a converter output voltage of predetermined curvature and frequency, characterized in that the converter (2) contains gate turn-off thyristors (27–30), that a circuit arrangement (4) is provided which prevents a phase displacement between the output current ($I_A$) and the output voltage ($U_A$), that the resonant circuit is a parallel resonant circuit (16, 15, 17, 18) and that the resonant circuit contains an inductor (16) and a capacitor (18) in which the inductor (16) is constructionally separated from the consumer.

15. Converter with a load which constrains a converter output voltage of predetermined curvature and frequency, characterized in that the converter (2) contains gate turn-off thyristors (27–30), that a circuit arrangement (4) is provided which prevents a phase displacement between the output current ($I_A$) and the output voltage ($U_A$), and that the load (16, 17, 18) is coupled to the converter (2) by a transformer (41, 42).

16. Converter according to any one of claims 1 or 3 to 14, characterised in that a matching device (25) is provided which has a device (100) for trimming the leading edge of a pulse as well as a device (101) for trimming the trailing edge and the device (102) for time-shifting the trimmed pulse.

17. Converter according to claim 16, characterised in that the devices (100, 101) for trimming the leading and trailing edges include comparators (107, 108, 115, 120) the switching threshold of which is adjustable.

18. Converter according to claim 17, characterised in that one input of the comparators (107, 108; 115, 120) are connected to a grounded capacitor (109, 110; 119, 120).

19. A converter according to claim 18, characterised in that an adjustable resistor (123, 124) is connected after a grounded capacitor (125, 126) and an inverter (127, 128) with a Schmidt-trigger input.

20. Converter according to any one of claims 1 or 3 to 14, characterised in that a thyristor control device (23) has separating circuits (140–143) which distribute the input signal to two outputs (172, 174 or 173, 175), whereby the first output (172) of one of the separating circuits (142) controls a first transistor (171) and a second output (174), and a second output of this separating circuit (142) controls a second transistor (170), and wherein the first output of the other separating circuit (143) controls a third transistor (151) and the second output of the other separation circuit (142) controls a fourth transistor (150).

21. A converter according to claim 16, characterised in that an adjustable resistor (123, 124) is connected after a grounded capacitor (125, 126) and an inverter (127, 128) with a Schmidt-trigger input.

22. A converter according to claim 16, characterised in that a thyristor control device (23) has separating circuits (140–143) which distribute the input signal to two outputs (172, 174 or 173, 175), whereby the first output (172) of one of the separating circuits (142) controls a first transistor (171) and a second output (174), and a second output of this separating circuit (142) controls a second transistor (170), and wherein the first output of the other separating circuit (143) controls a third transistor (151) and the second output of the other separation circuit (142) controls a fourth transistor (150).

23. A converter according to claim 17, characterised in that an adjustable resistor (123, 124) is connected after a grounded capacitor (125, 126) and an inverter (127, 128) with a Schmidt-trigger input.

24. A converter according to claim 19, characterised in that a thyristor control device (23) has separating circuits (140–143) which distribute the input signal to two outputs (172, 174 or 173, 175), whereby the first output (172) of one of the separating circuits (142) controls a first transistor (171) and a second output (174), and a second output of this separating circuit (142) controls a second transistor (170), and wherein the first output of the other separating circuit (143) controls a third transistor (151) and the second output of the other separation circuit (142) controls a fourth transistor (150).

25. Converter according to any one of claims 1 or 3 to 14, characterised in that an adjustable resistor (123, 124) is connected after a grounded capacitor (125, 126) and an inverter (127, 128) with a Schmidt-trigger input.

26. Converter according to claim 23, characterised in that the output of the inverter (127, 128) is connected to driver amplifiers (129, 131; 130, 132) which activate a thyristor control device (23).

27. A converter according to claim 26, is characterised in that a thyristor control device (23) has separating circuits (140–143) which distribute the input signal to two outputs (172, 174 or 173, 175), whereby the first output (172) of one of the separating circuits (142) controls a first transistor (171) and a second output (174), and a second output of this separating circuit (142) controls a second transistor (170), and wherein the first output of the other separating circuit (143) controls a third transistor (151) and the second output of the other separation circuit (142) controls a fourth transistor (150).

28. A converter according to claim 25, characterised in that a thyristor control device (23) has separating circuits (140–143) which distribute the input signal to two outputs (172, 174 or 173, 175), whereby the first output (172) of one of the separating circuits (142) controls a first transistor (171) and a second output (174), and a second output of this separating circuit (142) controls a second transistor (170), and wherein the first output of the other separating circuit (143) controls a third transistor (151) and the second output of the other separation circuit (142) controls a fourth transistor (150).

29. A converter according to claim 18, characterised in that a thyristor control device (23) has separating circuits (140–143) which distribute the input signal to two outputs (172, 174 or 173, 175), whereby the first output (172) of one of the separating circuits (142) controls a first transistor (171) and a second output (174), and a second output of this separating circuit (142) controls a second transistor (170), and wherein the first output of the other separating circuit (143) controls a third transistor (151) and the second output of the other separation circuit (142) controls a fourth transistor (150).

30. Converter according to claim 29, characterised in that the emitters of the first and second transistors (171, 170) are connected via an inductor (155, 154) to the collector of a gate turn off thyristor (27, 30) while its collector is connected via a capacitor (167, 166) to the control gate of this GTO thyristor (27, 30).

* * * * *